United States Patent [19]

Bearden et al.

[11] Patent Number: 5,029,023
[45] Date of Patent: Jul. 2, 1991

[54] LASER-AMPLIFIED MOTION DETECTOR AND METHOD

[75] Inventors: Alan J. Bearden, Berkeley; Michael P. O'Neill, Orinda, both of Calif.

[73] Assignee: Regents of The University of California, Oakland, Calif.

[21] Appl. No.: 414,897

[22] Filed: Sep. 29, 1989

[51] Int. Cl.⁵ .............................................. G11B 7/00
[52] U.S. Cl. .................................... 369/69; 369/53; 369/121; 372/9; 356/4; 356/237; 356/376; 356/356
[58] Field of Search ............... 346/76 L; 235/454; 372/9, 15; 358/93, 105; 356/4, 237, 376, 398, 355, 356, 359; 369/53, 69, 119, 121, 275.1; 324/158 R

[56] References Cited

U.S. PATENT DOCUMENTS

| | | | |
|---|---|---|---|
| 3,643,015 | 2/1972 | Davidovits et al. | 358/93 |
| 3,901,597 | 8/1975 | White | 356/4 |
| 4,011,748 | 3/1977 | Bond et al. | 73/601 |
| 4,130,360 | 12/1978 | Courtenay | 356/4 |
| 4,760,385 | 7/1988 | Jansson et al. | 340/709 |
| 4,902,966 | 2/1990 | Brust et al. | 324/158 R |

*Primary Examiner*—Robert L. Richardson
*Attorney, Agent, or Firm*—Peter J. Dehlinger

[57] ABSTRACT

Method and apparatus for measuring nanometer or picometer surface displacements in a target surface. A laser beam is directed against the target surface, and time-dependent variations in laser output power are measured. These variations, which are due to non-specular reflection of the incident beam by the target and reentry of the retroreflected light into the laser cavity, are used to determine time-dependent displacements at the target surface, based on a linear relationship between the measured power variations and surface displacements. The invention is useful for determining microscopic surface features of a surface, for high-density laser optical disc data storage and retrieval, and as an ultrasensitive transducer for sound or mechanical vibrations.

28 Claims, 8 Drawing Sheets

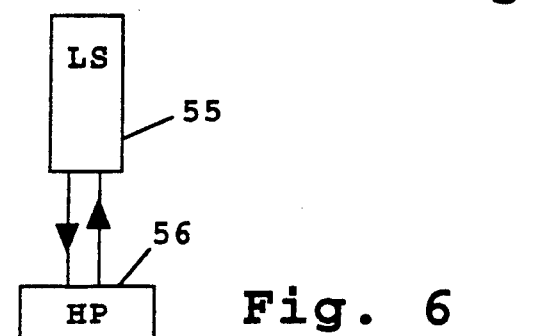
Fig. 5
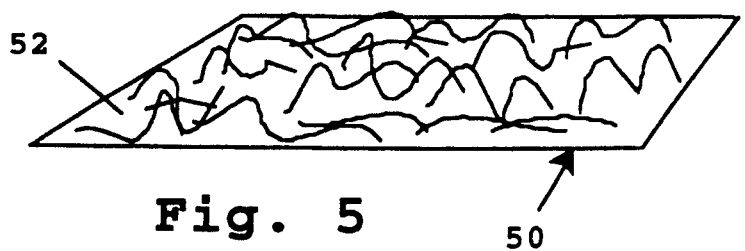
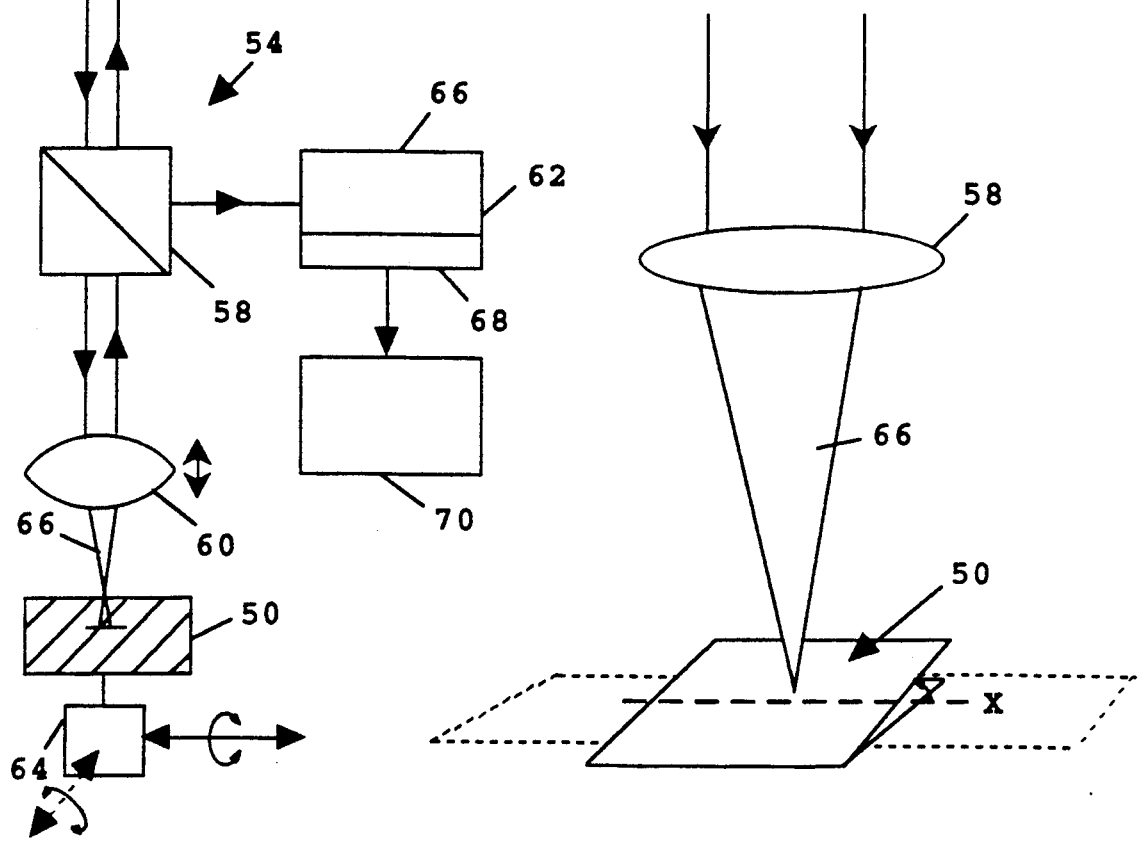
Fig. 6
Fig. 7

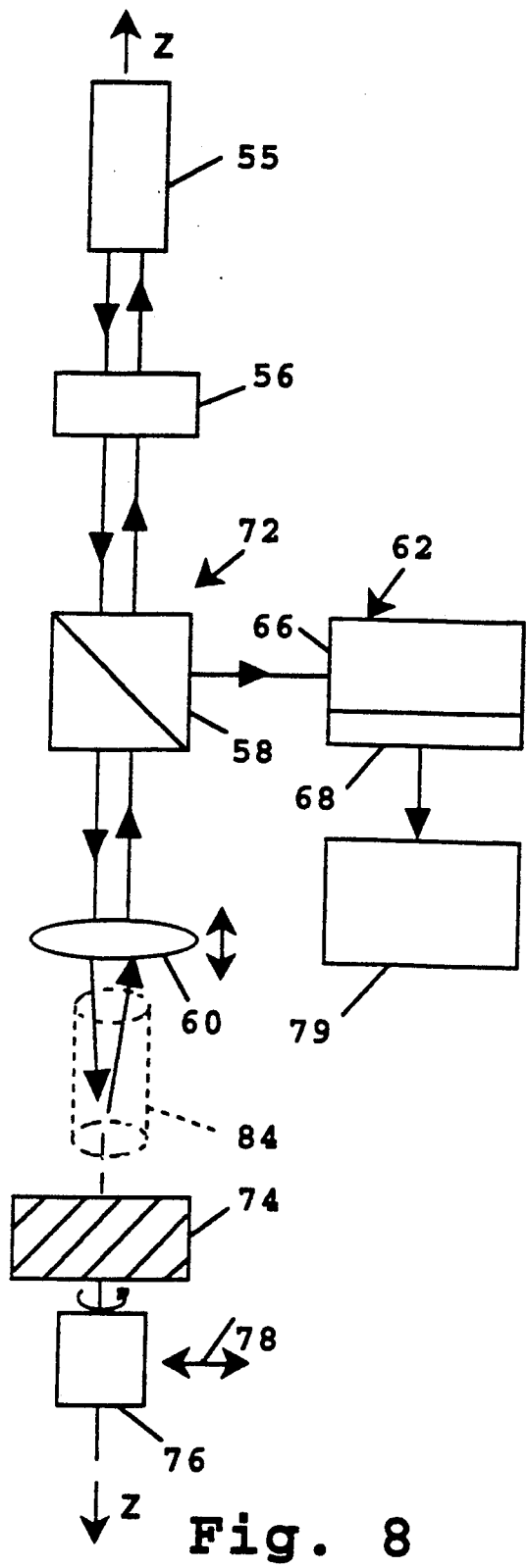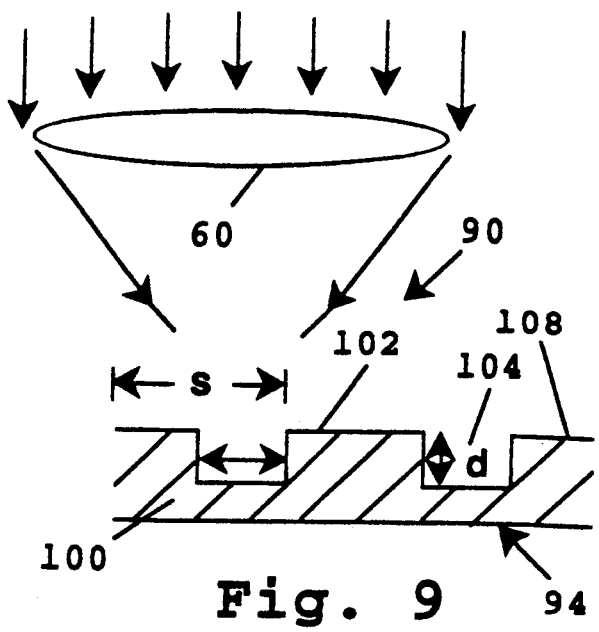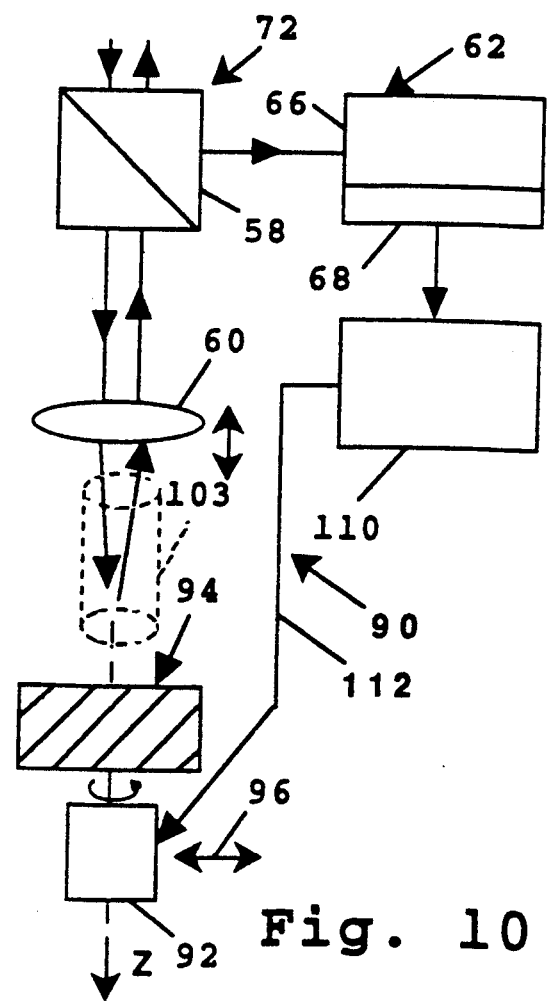
Fig. 8
Fig. 9
Fig. 10

LASER-AMPLIFIED MOTION DETECTOR AND METHOD

This invention was made with Government support under Grant Nos. 2S07RR07006-23 and 2S07RR07006-24 awarded by The Department of Health and Human Services. The Government has certain rights in this invention.

1. Field of the Invention

The present invention relates to the use of lasers for detecting time-dependent surface displacements in the nanometer/picometer range.

2. References

Deferrari H. A., Andrews F. A. J. Accoust. Soc. Am. 1966; 39: 979–980.

Deferrari H. A., Andrews, F. A. J. Accoust. Soc. Am. 1967; 42: 982–990.

Dragsten P. R., et al. Science 1974; 185: 55–57.

Drake A. D. IEEE Trans. Biomed. Eng. 1984; BME-31: 507–511.

Drake A. D., Lerner D. C. Rev. Sci. Instrum. 1984; 55: 162–165.

Hansma P. K., et al. Science 1988; 242: 209–216.

Khanna, S. M., et al, Science, 215:305–306 (1982).

Ohba R, Hehira I, J. Phys. E.: Sci. Instrum. 1987; 20:1380–1382.

Parthenopoulos, D. A., et al., Science, 245:843 (1989).

Rugar D, et al., Rev. Sci. Instrum. 1988; 59: 2337–2340.

3. Background of the Invention

Methods for determining nanometer or picometer surface displacements on a target surface have a number of potentially important applications. These include surface scanning techniques to map surface irregularities; (2) surface scanning microscopy, to measure out-of-plane displacement features in a target object; (3) high density optical recording systems in which digital information is optically encoded in the form of small surface displacements (Parthenopoulos); and (4) surface vibration measurements (Deferrari 1966, Drake) for use as an ultrasensitive microphone (Ohba) or recording device for mechanical vibrations (Dragsten).

High-resolution surface mapping, in the picometer range, can be carried out by electron tunnelling or atomic force microscopy (Hansma). However, both of these approaches require costly, high precision equipment, and are limited to measuring static surface features. Electron scanning microscopy (SEM), which is widely used for photographing surface features of a 3-dimensional object, has a potential surface resolution in the 10 nm ($10^{-8}$ meter range) range. SEM, however, requires highly sophisticated and expensive electron beam source and focusing equipment, and a static sample which must be maintained in a vacuum chamber.

High-density optical disc reading using lasers is becoming increasingly popular. The ultimate recording density of the system is, however, limited by (a) the density of data-bit locations which can be placed on a surface of a disc medium, (b) the total disc surface area, and (c) the limitation that only a single bit, i.e., binary data, can be placed at each data-bit location on the disc.

Interferometry, the superposition of coherent beams of light to yield an interference pattern of alternating dark and light fringes, has long been used to measure small surface displacements; that is, displacements in the range of a fraction of an wavelength of visible light (Deferrari 1966, Deferrari 1967, Drake) For example, interferometers using the two-arm, two-mirror Michelson, Mach-Zehnder, or Fizeau configurations and a monochromic laser light source have displayed the capability of determining the difference in optical path length between two highly reflecting mirrors down to about 1 picometer (pm, or $10^{-12}$ meters) or less. The ability to make motional displacement measurements involving amplitude and frequency by interferometry depends on the exact details of construction, but the efficiency of such interferometric methods is dependent on the interference of two nearly equally intense beams of light. For small displacements, this usually requires that the target surface be reflect more than a few percent of the incident light. For example, in determining the nanometer motion of the basilar membrane of the cat ear, it was found necessary to place a highly reflective gold mirror on the sensitive membrane in order to obtain results (Khanna).

SUMMARY OF THE INVENTION

It is one general object of the invention to provide, for measuring time-dependent surface displacements down to 10 picometers or less, a method and apparatus which overcome or reduce many of the problems and limitations of above-noted prior art methods used for measuring small surface displacements and/or motional effects.

A related object of the invention is to provide such method and apparatus which is based on a simple optical configuration.

The invention includes, in one general aspect, a method for measuring time-dependent surface displacements in a target surface, in the picometer/nanometer range of displacement magnitudes. A coherent incident light beam from a stable-resonator laser is directed at the target surface on which time-dependent surface displacements are occurring, due to vibrations on the target surface and/or to relative movement of the laser beam across the target surface. The beam back reflected from the target surface, which is coincident with, but phase-shifted with respect to the incident beam, is allowed to reenter the laser resonator cavity, producing a shift in the power output level of the laser beam. Measured time-dependent variations in the laser beam power are then used to determine time-dependent displacements on the target surface, by applying a linear relationship between the magnitude of such variations and time-dependent displacements.

The target surface preferably produces diffuse, non-specular reflection. Alternatively, specular reflection from the target surface can be attenuated, e.g., by a polarizer filter, before reentering the laser cavity as retroreflected light.

In one embodiment, the method is used in examining surface features of a target along the axis of the incident beam. Here the incident laser light is focused to a beam point which lies substantially in the plane of the surface to be examined, and the beam point is scanned over the surface of the target. The position-dependent variations in laser beam power are used to construct a surface-displacement map.

In another embodiment, the method is used in the retrieval of stored data. The target in this embodiment is a data storage disc in which digital information is stored on the disc in the form of binary-bit or multiple-bit displacements at each of a large number of data storage positions on the disc. With the incident laser beam focused at a point on the surface of the data disc, the beam point is moved relative to the disc surface to place the beam point successively at selected data storage positions, with such moving producing time-dependent surface displacements. The time-dependent laser power variations which are produced are used to determine the digital data value at each of the selected disc locations.

The information storage density in the method can be enhanced several fold, in one approach, by encoding data on the disc surface in the form of surface displacements whose surface relief can represent any one of a $2^{N>1}$ data bits. Alternatively, or in addition, a disc storage device may be composed of several transparent data discs of this type stacked in a spaced, parallel array. The incident laser beam may be focused on a selected disc in the array by a movable objective lens, to allow reading of a selected discs.

In still another embodiment, the method is used to measure the frequency and amplitude of vibrations on the surface of a target, where the amplitude of the vibration is determined from the time-dependent variations in the power level measured by a light intensity detector, and the frequency is determined from the frequency of the time-dependent variations in power level. The method may be employed, for example, in transducing sound or other mechanical vibrations to electrical signals.

In another aspect, the invention includes an apparatus for measuring time-dependent surface displacements in the picometer/nanometer range of displacement amplitudes. The apparatus includes a stable-resonator laser having a resonator cavity, for use in producing a coherent output light beam, and a device for measuring the power output of the output beam. A portion of the laser output beam, or incident beam, is directed against the surface of the target, and the back reflected coherent beam produced by reflection from the target, and which is coincident with the incident beam, is allowed to reenter the resonator cavity of the laser, as retroreflected light.

A data-output unit in the apparatus functions to convert the measured power variations in laser signal to signal-related information, in which the time-dependent power variations are linearly related to the time-dependent displacements at the target surface.

The apparatus is used, in one embodiment, for examining position-dependent surface displacements on a target surface. This apparatus further includes structure for moving the incident beam to selected positions on the target, in a time-dependent fashion, to produce time-dependent variations in surface displacement seen by said incident beam.

Also forming part of the present invention is apparatus for retrieving data which is encoded in the form of position-dependent surface displacements. This apparatus includes, in addition to the above-described laser and photodetector elements, a data storage disc on which position-dependent surface displacement digital data is encoded. The surface displacements on the storage disc may represent binary or multi-bit digital information.

The apparatus further includes structure for positioning the laser beam, in a time-dependent fashion, at selected positions on the disc surface, such that the beam sees time-dependent variations in surface displacements on the disc. A data-output unit in the apparatus functions to determine from the time-dependent variations in the laser output beam, the digital data value at each of the selected positions on the disc, by applying a linear relationship between such power variations and digital values.

In still another aspect, the invention includes apparatus for transducing external sound or other mechanical vibrations to electrical signals. The apparatus includes, in addition to the above laser and photodetector elements, a target place or diaphragm which is responsive to external vibrations, to produce surface vibrations which have time-dependent surface displacements in the picometer/nanometer range of displacement magnitudes.

The apparatus may be used as a microphone, in which case the power level variations are converted to an analog or digital form suitable for sound production, or for recording vibrations in a solid medium, in which case the amplified power level variations are converted to a digital form suitable for signal processing.

These and other objects and features of the invention will become more fully apparent when the following detailed description of the invention is read in conjunction with the accompanying drawings.

BRIEF DESCRIPTION OF THE DRAWINGS

FIG. 5 is a schematic diagram of the microscopic features of a target surface;

FIG. 6 shows a schematic diagram of an apparatus for mapping the surface features of a target surface, in accordance with one embodiment of the invention;

FIG. 7 shows a configuration of the apparatus for mapping x-y features of a target surface;

FIG. 8 is a schematic diagram of an apparatus for measuring surface roughness;

FIG. 9 shows the focusing lens of a optical disc reader and the surface features of a typical optical disc;

FIG. 10 is a schematic diagram of an apparatus for reading an optical disc in accordance with another embodiment of the invention;

DETAILED DESCRIPTION OF THE INVENTION

I. Laser Amplified Motion Detection

Figure 1:
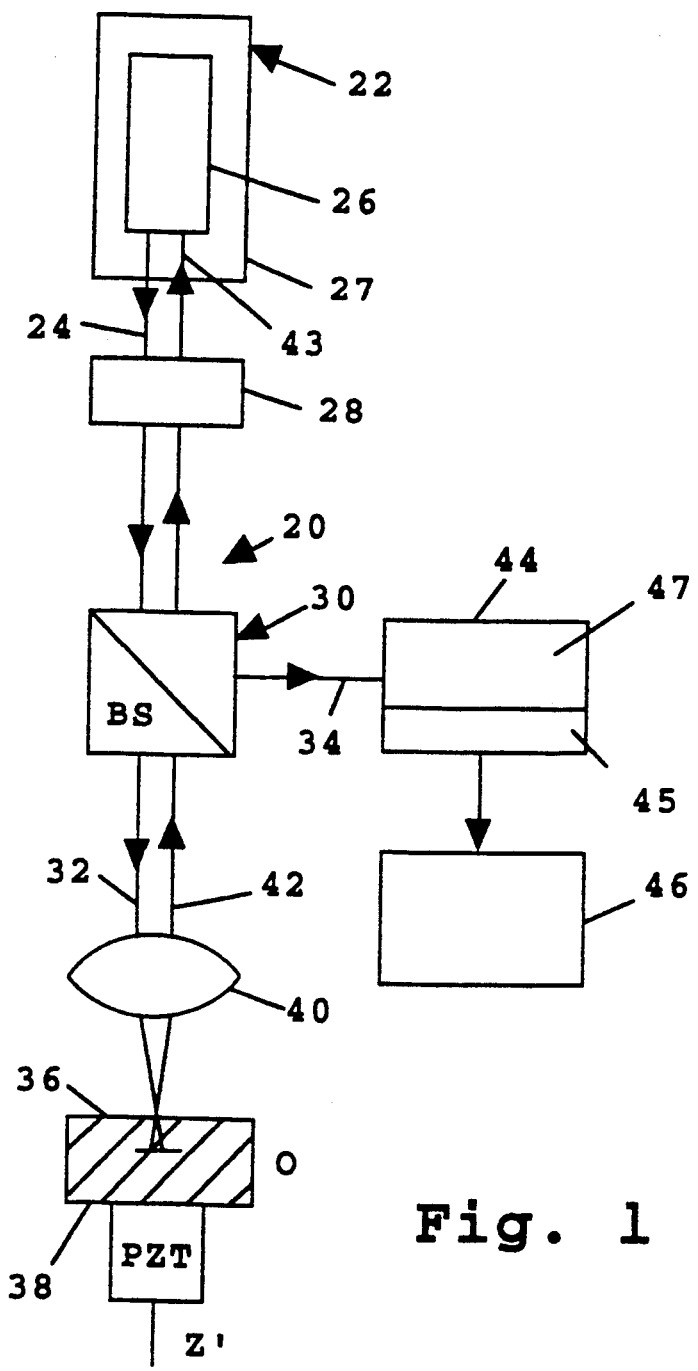
FIG. 1 is a schematic diagram of an apparatus for measuring surface displacements, in accordance with the invention.

FIG. 1 is a schematic diagram which shows the basic components of a motion-detector apparatus 20 constructed according to the present invention. The apparatus generally includes a stable-resonator laser 22 designed to produce a coherent, single-mode output light beam 24. The laser, which may be of conventional design, includes a resonator cavity 26 housed within a housing 27, and internal optical and circuit features (not shown) which function to stabilize the power output of the laser.

One preferred type of laser is a low-power He-Ne gas laser operating in two longitudinal modes, each of which is linearly polarized. An internal linear polarizer blocks the passage of one of the two modes, so that only a single linearly polarized low-power beam is available externally. One laser of this type which is suitable commercially available is a Spectra-Physics ™ Model 117A He-Ne single-mode gas laser.

Where, as in the present embodiment, the laser output is linearly polarized, the beam is passed through a half-wave plate 28 which allows the direction of linear polarization to be rotated in a plane perpendicular to the output beam. This effect can also be achieved by rotating the laser itself. Following the half-wave plate, the beam is split by a polarization-dependent beam splitter 30 which passes the component of linear polarization parallel to the plane of incidence straight through, and deflects by 90° light whose linear polarization is normal to the plane of incidence. The portion of the laser output beam which is passed through the beam splitter is also referred to herein as an incident beam, and is indicated at 32 in FIG. 1. The portion of the laser output beam which is deflected by the beam splitter is also referred to herein as a secondary beam, and is indicated at 34 in the figure.

The incident beam or beam portion is directed onto the surface 36 of a target 38 whose time-dependent surface displacements are to be measured, in accordance with the invention. The incident beam is focused onto the target surface by an adjustable-focus objective lens 40 whose focal plane is at or near the target surface plane.

A back reflected light beam 42, i.e., a coherent light beam which is reflected by the target back along the path of the incident light beam, (the incident and back reflected beams, which are coincident light beams, are shown as separate lines in FIG. 1 only for the sake of clarity), is transmitted by the beam-splitter and reenters the optical resonator cavity of the laser, as indicated in the figure. The back reflected light beam which reenters the laser cavity is also referred to herein as the retroreflected light beam, and is indicated at 43 in the figure. The phase of the retroreflected light is modulated by time-dependent motion of the target surface along the direction of the incident beam. The phase change of the retroreflected light, in turn, shifts the operating point on the atomic gain curve of the laser, thus modulating the power output of the laser.

The beam splitter is also referred to herein as means for directing a portion of the output light beam against the surface of such target, and permitting back reflected coherent beam produced by directing said beam portion against such target surface and which is coincident with said beam portion to reenter the resonator cavity of the laser.

According to an important aspect of the invention, it has been discovered that the retroreflected light beam, when controlled to be only a small portion of the total incident light beam, produces a variation in the laser power output which is linearly related to small target surface displacements in the direction of the incident beam. The range of displacements which can be measured is in the picometer/nanometer range, and more specifically in the range from about 1 picometer ($10^{-12}$ meters) up to about one-fourth of the laser beam wavelength, that is, up to several hundred nanometers ($10^{-7}$ to $10^{-6}$ meters, nm). Even greater resolution, down to about 0.1 picometer is theoretically possible by limiting laser fluctuation noise, detector noise, and apparatus vibrational effects, as noted below.

The surface displacements which are to be measured, in accordance with the invention, are preferably time-dependent displacements which may vary over a wide frequency range, as will be seen below. The time-dependent displacements on the target surface may be due either to vibrations on the target surface, as described particularly in Section IV below, or due to relative movement of the incident beam over a target surface have position-dependent surface displacements, as described particularly in Sections II and III below.

As indicated above, the retroreflected light beam 43 which enters the laser cavity must be only a small portion of the incident beam, typically about $10^{-3}$ or less of the total incident-beam power. This level is achieved, generally, when the target surface gives non-specular reflection, and preferably less than about 0.1% of specular reflection. For a surface which gives specular reflection, the level of retroreflected light can be reduced to a desired low level, in one approach, by tilting the plane of the target, so that the back reflected light beam which enters the laser, i.e., the retroreflected light beam, represents diffuse reflection from the surface. Alternatively, the back reflected light beam may be passed through a half-wave plate and beam-splitter or through a neutral density filter before reaching the laser, to produce the desired power attenuation in the retroreflected beam.

The secondary beam or beam portion from the laser is directed onto a photodetector 44 designed to measure the power of the laser output beam, in this embodiment, by measuring the power of the deflected, secondary beam or beam portion. The photodetector in the embodiment shown includes a silicon photodiode 47 which designed to measure light intensity. One suitable type of photodiode is an EE&G SGD 100-A silicon photodiode. The photodiode is connected to an operational amplifier 45 in the photodetector which outputs an AC component voltage which is linearly proportional to the power of the light beam detected by the photodiode. The operational amplifier characteristics are such that the voltage signal output which is typically obtained is in the microvolt/millivolt range. The photodetector is also referred to herein as means for measuring the power output of the laser output signal.

It will be appreciated from the above, and in accordance with an important aspect of the invention, that the variations in power output measured by the photodetector produce a time-dependent voltage output signal in which (a) the amplitude of the voltage signal is linearly related to the amplitude of surface displacement which caused the time-dependent change in laser power output, and (b) the frequency of the voltage signal is just the rate of change of surface displacements causing the laser power fluctuations.

Apparatus 20 may also include a data output unit 46 for processing and/or storing the photodetector output signal or for converting the power output variations measured by the photodetector to signal-related information. Particularly, where the apparatus is designed to output a signal related to surface-displacement variations, as described in Section IV below, the output unit may include signal processing features for filtering, smoothing, averaging and/or storing the output signal from the photodetector.

Alternatively, the apparatus may be designed to output signal-related information, which may take one of a variety of forms. For example, where the apparatus is designed to measure surface features of a target, as described in Section, the output device may be designed to produce a map of surface displacements as a function of surface position, such as where the surface displacements represent stored digital information. Alternatively, where the apparatus is designed to read optical code information encoded on a target surface in the form of surface displacements, the output device functions to measure time-dependent voltage amplitudes, and convert these to digital or other displacement-dependent values.

The apparatus just described is used, in accordance with another aspect of the invention, in a method for measuring time-dependent surface displacements in a target surface, in the range of displacement magnitudes in the picometer and nanometer range. In practicing the method, at least a portion of a coherent output beam from a stable-resonator laser, such as laser 22, having a resonator cavity, such as cavity 26, is directed at the target surface on which time-dependent surface displacements are occurring. The back reflected coherent beam from the target surface is allowed to reenter the resonator cavity of the laser, causing time-dependent variations in the power output beam of the laser. These variations are measured, and used to determine the amplitudes of the time-dependent displacements, as a substantially linear function of time-dependent variations in the measured power output of the output beam.

Figure 2:
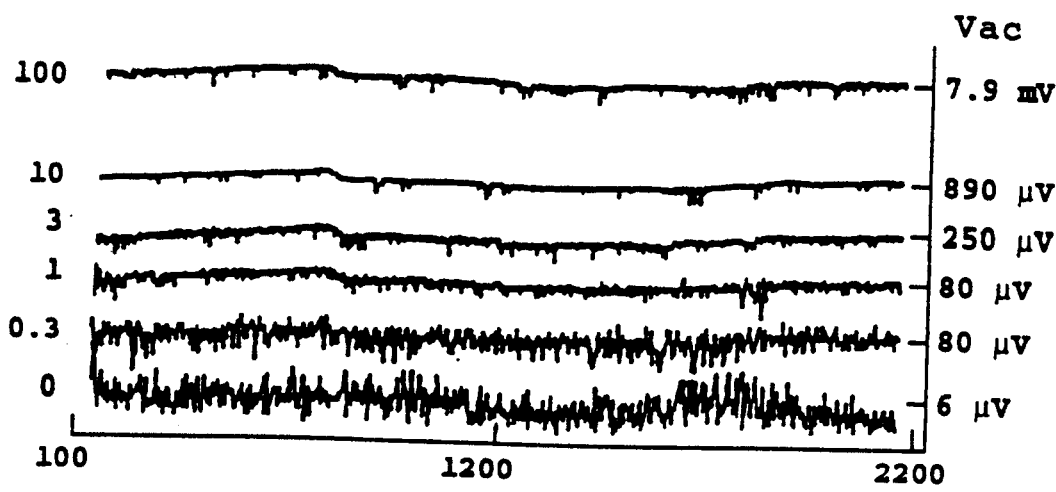
FIG. 2 shows spectra of laser power variations produced by target surface vibrations, as measured at several vibration amplitudes, indicated at the left of the spectra in nanometers, and over vibrational frequencies between 200–2200 Hz.
Figure 3:
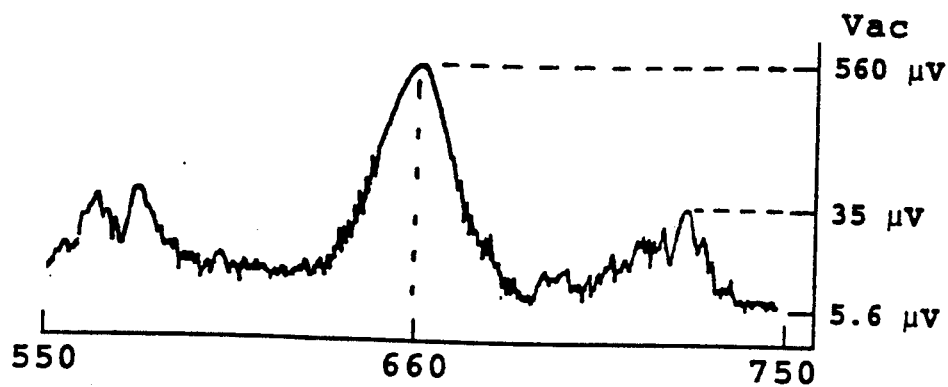
FIG. 3 shows a portion of a spectrum of laser power variations produced by a target surface vibration at 600 Hz.
Figure 4:
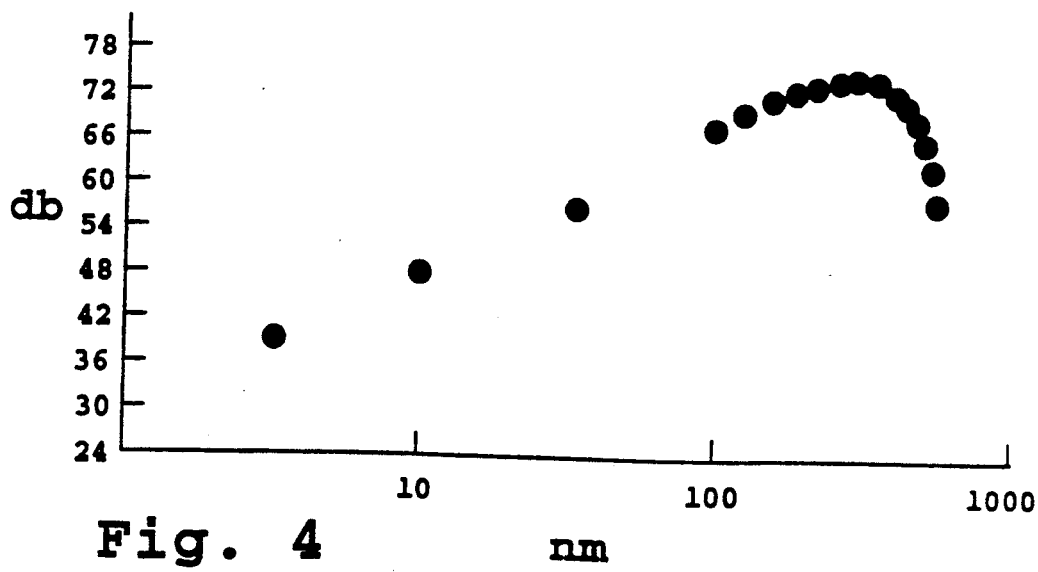
FIG. 4 shows a plot of peak power fluctuation at a fixed frequency, as a function of increasing peak amplitudes of vibration.

The method of the invention, as applied to determining amplitudes of surface vibration in a target surface, are illustrated in the surface target measurements shown in FIGS. 2-4. FIG. 2 illustrates the signal generated by apparatus 20, in response to a vibrating target surface. The target here is a commercially available piezoelectric transducer having a response of about 4.4 nm displacement/V. A stiff paper card was attached to the surface of the transducer to serve as the vibrating target surface. Voltages from a sinewave oscillator (10 Hz to 20 kHz) or the synchronized sweep frequency output from an audio spectrum analyzer (Hewlett-Packard 3580A) were used to drive the transducer directly or through an amplifier for the larger motional amplitude ranges. It is noted here that higher or lower vibration frequencies can be employed.

The piezoelectric's vibration amplitude is shown at the left axis in FIG. 2, and the corresponding power output in voltage units, along the right axis. For each voltage applied to the transducer the frequency was swept or varied from 200 Hz to 2.2 kHz. The flatness of the traces indicates the flat response of the piezoelectric over the range of driving frequency.

It can be appreciated from the spectra shown in FIG. 2 that the amplitude of the measured signals is linearly related to the amplitude of the transducer vibrations. For example, with reference to the two spectra at the top in FIG. 2, a tenfold increase in vibration amplitude (from 10 to 100 nm) corresponds to an approximately ten-fold increase in detected laser output measured as a voltage; similarly, a 100-fold increase in vibration amplitude yields an approximately 100-fold increase in measured voltage. The noise in the spectra for vibration amplitudes below 1 nm is due to background electronic noise and random laser light beam output variations.

Similar results were obtained when the target surface was a transducer covered with brushed steel, plastic, and mylar.

The signal-to-noise ratio as monitored by the output of the operational amplifier is due to laser-light intensity fluctuations and electronic noise in the photodetector. The exact noise voltage at the output of the current-to-voltage electronics depends on the specific laser's amplitude fluctuations, the detector and its associate circuitry, and on the bandwidth of the measurement. For the bandwidth of the circuit used, the noise voltage was 2 microvolts, giving a signal-to-noise ratio of at least 40 dB.

In the apparatus described above, displacement measurements down to the 10 picometer range have been made. The limiting noise in the apparatus is due predominantly to laser amplitude fluctuations, which in theory can be reduced by up to two orders or magnitude. It is also noted that detector noise levels down to $10^{-2}$ pm/(Hz)$^{-1/2}$ have been reported (Rugar et al.). Thus, assuming that mechanical vibrations in the apparatus can be reduced sufficiently, the apparatus should be able to detect time-dependent surface displacements down to the 0.1–1 picometer range, particularly by employing phase-lock or time-averaging signal-to-noise improvement techniques.

FIG. 3 shows the detected power output shift for a piezoelectric vibrating at 600 Hz and a fixed amplitude. The peaks on either side are due to the effect of external vibrations of the apparatus.

The range of linearity with respect to amplitude can be determined by keeping the frequency constant as the amplitude is varied and plotting the power output vs. amplitude as in FIG. 4. The linear relationship holds over a range of vibration amplitudes extending below about one quarter of the incident light's wavelength. For vibration amplitudes greater than this upper limit, the relationship becomes non-linear. However, it is noted that the relationship between vibration amplitude and measured laser power output in the high-amplitude range is still predictable, and therefore useful in determining large-amplitude displacements from the measured power output fluctuations of the laser. For a He-Ne laser, the wavelength of emitted light is 632 nanometers; thus, the range of linearity (taking background noise into consideration) extends up to about 150 nm.

II. Surface Feature Detection

This section describes the application of the method and apparatus described above for use in surface-feature mapping or detection. FIG. 5 shows a portion of a target 50 whose target surface 52 has a number of irregular surface features. The surface displacements of these features, i.e., displacements in the direction normal to the plane of the target surface, are in the picometer/nanometer range. By placing the sample surface perpendicular to the incident beam of laser in an microscope apparatus, and moving the sample in a point-by-point or scanning fashion with respect to the beam, the present invention may be may be used to map the z-axis displacements of the surface.

Similarly, a series of measurements taken with the sample tilted sightly in the x-y plane will permit measurement of x-y features. The sample data can be accumulated in a computer memory and standard computational techniques may be employed to reconstruct a high-resolution image of the surface.

FIG. 6 shows a schematic diagram of a microscope apparatus 54 constructed in accordance with the invention. The apparatus generally includes a stable-resonator laser 55, a half-wave plate 56, beam-splitter 58, adjustable-focus objective lens 60, and photodetector 62 designed and arranged as described above with reference to apparatus 20.

In addition, apparatus 54 includes a movable stage 64 which supports the target, such as target 50, for moving the target both in an x-y plane (the plane normal to the incident laser beam) and for rotating the plane of the target either about the x or y axis as indicated by the arrows in FIG. 6. The movable stage is also referred to herein as means for moving the target with respect to the incident laser beam, here indicated at 66. The design and operation of such a movable stage is conventional.

When the incident beam strikes the target surface a small proportion the reflected light travels directly backward along the path of the incident beam as back reflected light, and this reflected light enters the laser cavity as retroreflected light. As the target surface is then moved with respect to the beam, the position-dependent displacements in the surface are observed by the beam as time-dependent displacements, and these produce variations in laser output, as described above. As in apparatus 20, the power output is measured by photodetector 62 composed of a photodiode 66 and a operational amplifier 68 which outputs a time-varying voltage signal whose voltage amplitude is linearly proportional to the magnitude of displacements on the target surface. The detector sends this output signal to data-output unit 70 designed for signal processing and image reconstruction. For example, unit 70 may include a microprocessor and software designed to convert the time-dependent amplitude voltage signal to position-dependent surface displacements, and to use these determined position and displacement values to construct a surface map of the target. The construction and operation of the output unit would be well-known to those skilled in microprocessor design.

It will be appreciated that when the target surface is positioned in the x-y plane (normal to the incident laser beam), the surface map produced as above will show z-axis displacements on the target surface. To measure x-y features of the surface, the stage is rotated slightly in either the x or y axis, as shown in FIG. 7, and the stage then moved to "scan" the laser beam over the tilted surface. The x-y features which are detected by scanning in a tilted plane can be used to reconstruct x and/or y features of the target, using suitable signal-amplitude transformations in the output unit.

The x-y plane resolution achievable by the microscope just described is, of course, limited by the area of the incident beam spot which is scanned over the target surface. Using conventional lens optics to focus the incident beam, the beam spot may be on the order of 1 $\mu m^2$ or somewhat less. This x-y plane resolution can be improved substantially by using a optical waveguide to focus the incident beam on the target surface, rather than an optical lens. That is, the lens structure shown at 66 in the figure now represents a waveguide.

The optical waveguide can be constructed, according to known principles, to focus the incident beam down to about a 10 $nm^2$ spot. It i recognized that the end of the waveguide would itself have to be positioned quite close to the target surface, e.g., about 10 nm.

FIG. 8 shows a modified microscope 72 constructed for measuring surface roughness features or the like of a target which can be rotated, such as disc-like target 74 in the figure. To the extent the microscope is identical to microscope 52, the elements of the microscope are designated with the same reference numbers used in FIG. 6.

Target 74 in the figure is mounted on a movable stage 76 which is designed to rotate the target about the z axis at a selected speed, and to advance the target along an axis through the center of rotation, in the directions indicated by arrow 78 in the figure. The stage is also referred to herein as means for moving the beam relative to the target surface.

The data output unit in the microscope apparatus, indicated at 79, is constructed to convert the time-varying voltage signal received from the photodetector to a surface map showing z-axis surface displacements as a function of x-y position on the surface.

As can be appreciated from the above, rotation of the target, coupled with target translational movement, results in time-dependent laser power variations which are linearly related to position-dependent surface displacements; and these can be used to construct a surface-feature map.

In addition to the two embodiments just described, the invention can be further modified for detecting remote surface features, where the incident laser beam is directed from the laser (or a beam splitter) to the target surface, and the back reflected light is carried from the target to the laser through an optical fiber. A portion of such an optical fiber is indicated in dotted lines at 84 in FIG. 8.

III. Optical Data Storage and Retrieval

FIG. 10 is a schematic view of a portion of an optical code reader or apparatus 90 constructed according to another embodiment of the invention. The apparatus includes the basic optical elements of apparatus 72 shown in FIG. 8, including a stable-resonator laser, and a half-wave plate, such as shown at 55 and 56 in FIG. 8, a beam-splitter 58, an adjustable-focus objective lens 60, and photodetector 62. As above, the incident and back-reflected beams may be carried between the laser and target by an optical fiber, a fragment of which is indicated by dotted lines at 93 in FIG. 10.

The apparatus further includes a movable stage 92 which supports a data disc, such as data disc 94 shown in FIGS. 9 and 10, for rotating the disc around a z-direction axis, at a selected rotational speed, and for translating the disc in selected directions in the x-y plane, as indicated by arrow 96. The stage is constructed and controlled according to conventional design to place selected x-y data storage positions on the disc at a position for reading by the incident beam. The movable stage is also referred to herein as means for moving the disc with respect to the incident laser beam, for scanning selected data storage positions or locations on the surface of the disc.

FIG. 9 shows an enlarged fragmentary portion of data storage disc 94. The upper disc surface has a plurality of circular data-storage positions. The positions may be arranged in a spiral pattern or in concentric rows on the disc, according to conventional optical disc practice. Each data position carries a binary-bit datum which is indicated by either of two surface levels: either no depression or a depression having at least a threshold depth. The disc surface is preferably constructed for non-specular reflection, and the depth of the depressions formed in the disc are preferably in the 100 picometer-10 nanometer range. The data may be encoded on the disc by conventional laser disc recording methods.

Also included in the optical code reader apparatus is a data output device 110 which is designed to convert time-dependent amplitude changes in the voltage signal received from the photodetector to binary data values at each of the selected disc locations which was "read". The construction and operation of the data output unit, which is also used to control the position of stage 92, through a control bus 112, for reading selected disc locations, is according to conventional laser data disc control design.

In operation, an incident laser light beam is directed onto the surface of a data disc, and the disc is moved, in a time-dependent fashion, to place selected data positions on the disc in the beam path. As the disc is moved, both rotationally and translationally in the sight of the beam, the data depression in the disc will be seen as position-dependent surface displacements, and recorded, as above, as time-dependent variations in laser power output. The time-varying voltage signal which is then measured at the photodetector is converted by unit 110 to position-dependent data values.

Figure 11:
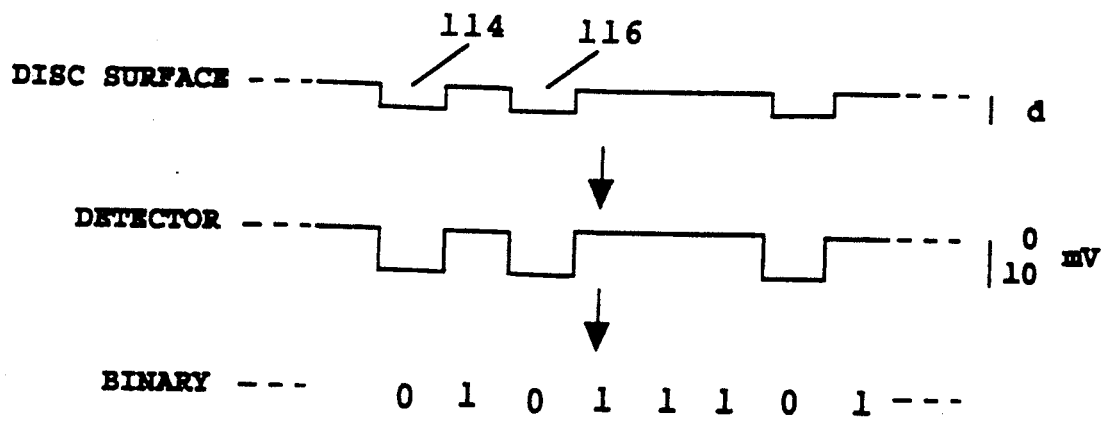
FIG. 11 illustrates the relationship between optical disc surface features, the voltages detected by an apparatus in accordance with the invention, and the translated binary code.

FIG. 11 illustrates how surface displacements in a disc surface, such as depressions 114, 116 (top line in FIG. 11) are read as a time-dependent voltage amplitude changes (middle line in the figure), and how these voltage changes are converted to a binary information string (bottom line in the figure).

Figure 12:
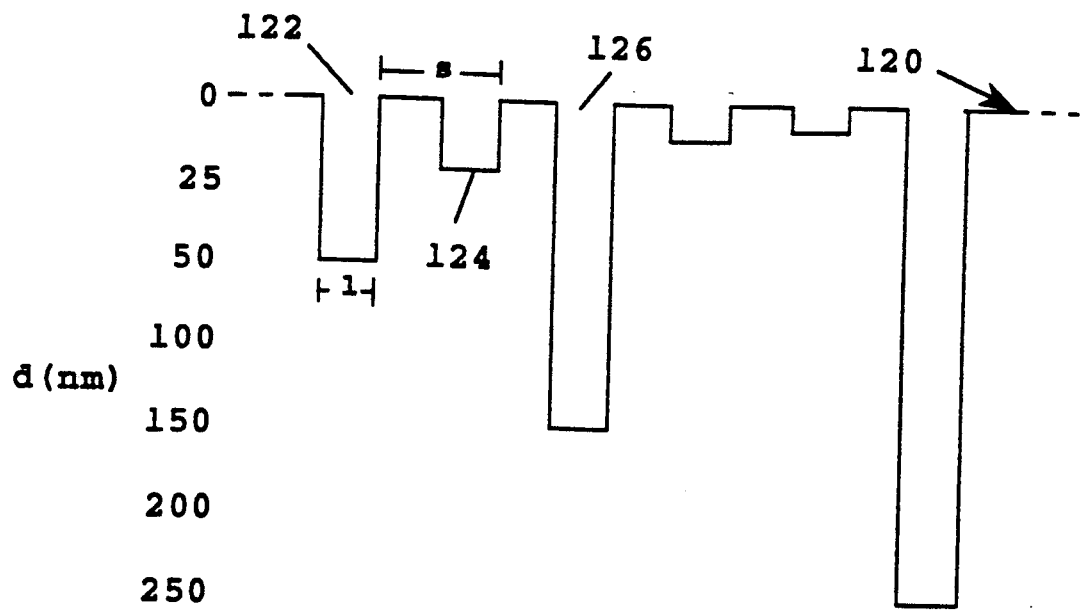
FIG. 12 shows the surface features of an optical disc carrying multi-bit data displacements, in accordance with an embodiment of the invention.
Figure 13:
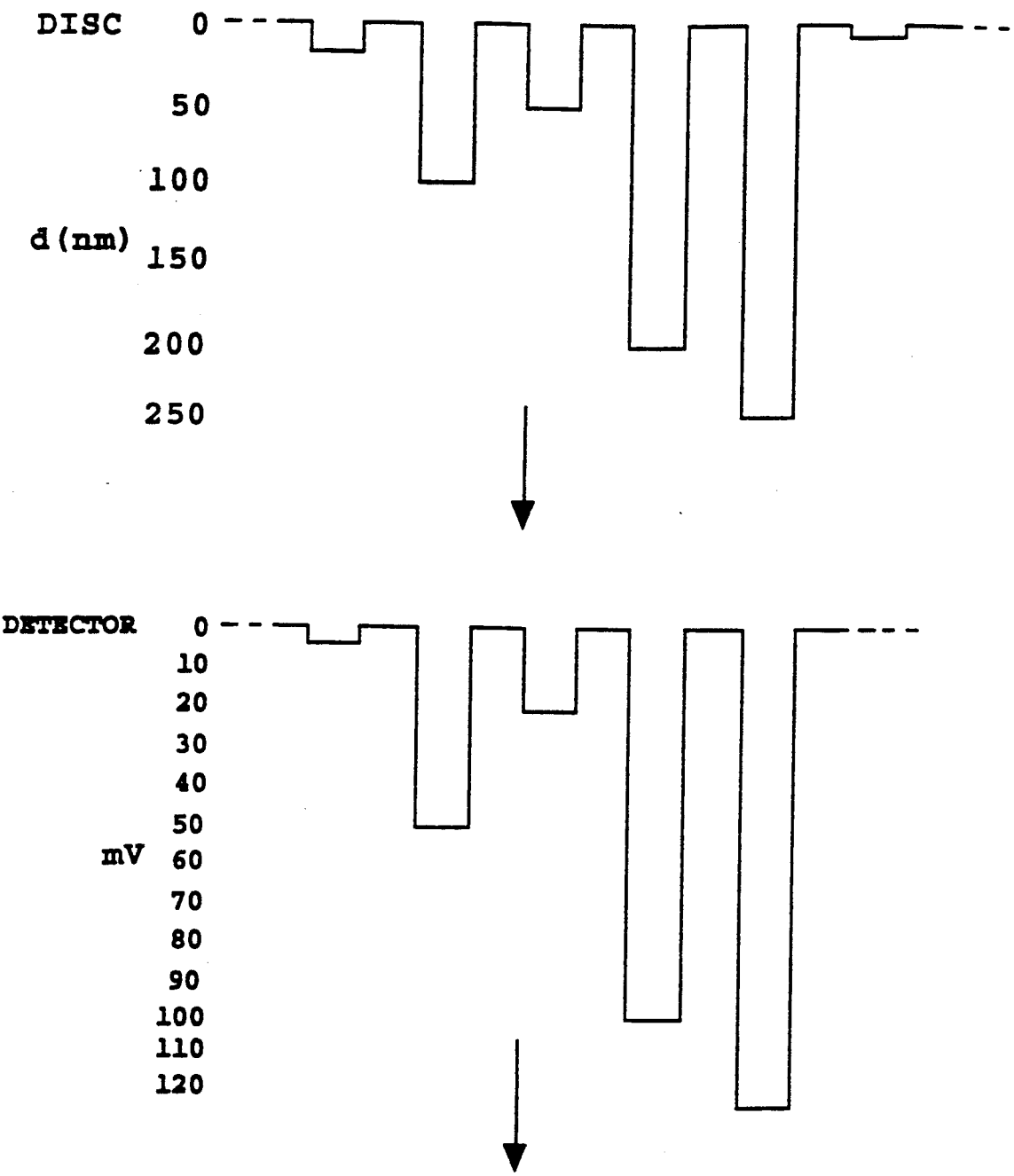
FIG. 13 illustrates the relationship between the surface features of a optical disc as described in the invention, the voltages detected by an apparatus in accordance with an embodiment of the invention, and the translated binary code.

According to another embodiment, each data-storage position on the disc may be encoded with multi-bit data in which one of several possible $2^n$ data states is represented by one of $2^n$ different surface depression depths, as illustrated in FIG. 12. In particular, this figure illustrates the surface portion of a data disc 120 having a plurality of different data-storage positions, such as positions 122, 124, and 126. In the embodiment shown, each data position is a hole or depression having one of 255 different depths corresponding to one of 56 different data values (one value being represented by no surface displacement. For example, the depths could vary in 400 picometer intervals between 0 and 100 nanometers. As above, the power output of the laser monitored by the detector would show variations (middle row, FIG. 13) which are proportional to the hole depths (top row, FIG. 13). These power variations are then converted by the data output unit into binary numbers of from 0 to 256, as indicated at the bottom in FIG. 13.

To appreciate the magnitude of the improved storage density, if the laser uses a NA (numerical aperture) 0.6 100X objective lens for focusing, the standard datum spot would have an area of about one square micron. A typical 5 inch audio CD disc has an area of about 80 cm, and could store $4.8 \times 10^9$ bits. In the present invention, this density could be increased by a factor of 8, to $6.4 \times 10^{10}$ bits.

Figure 14:
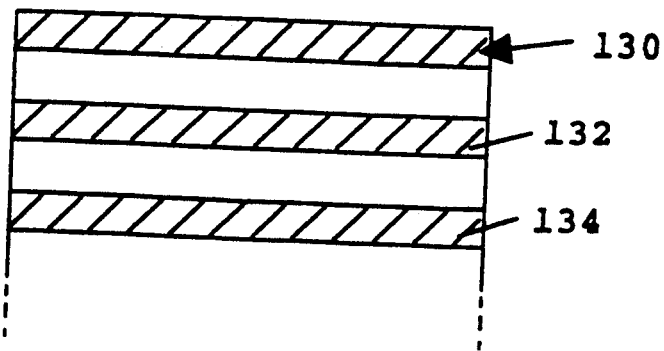
FIG. 14 shows a set of stacked optical disks in accordance with an embodiment of the invention.

This concept can be extended to a third embodiment of an optical disc reader in which several optically transparent discs are stacked to provide increased storage density, as illustrated in FIG. 14. Here a stacked-disc device 130 is composed of individual transparent discs, such as discs 132, 134, which are each constructed according to one of the two embodiments described above, where the data is stored in either binary-bit or multiple-bit form.

Figure 15:
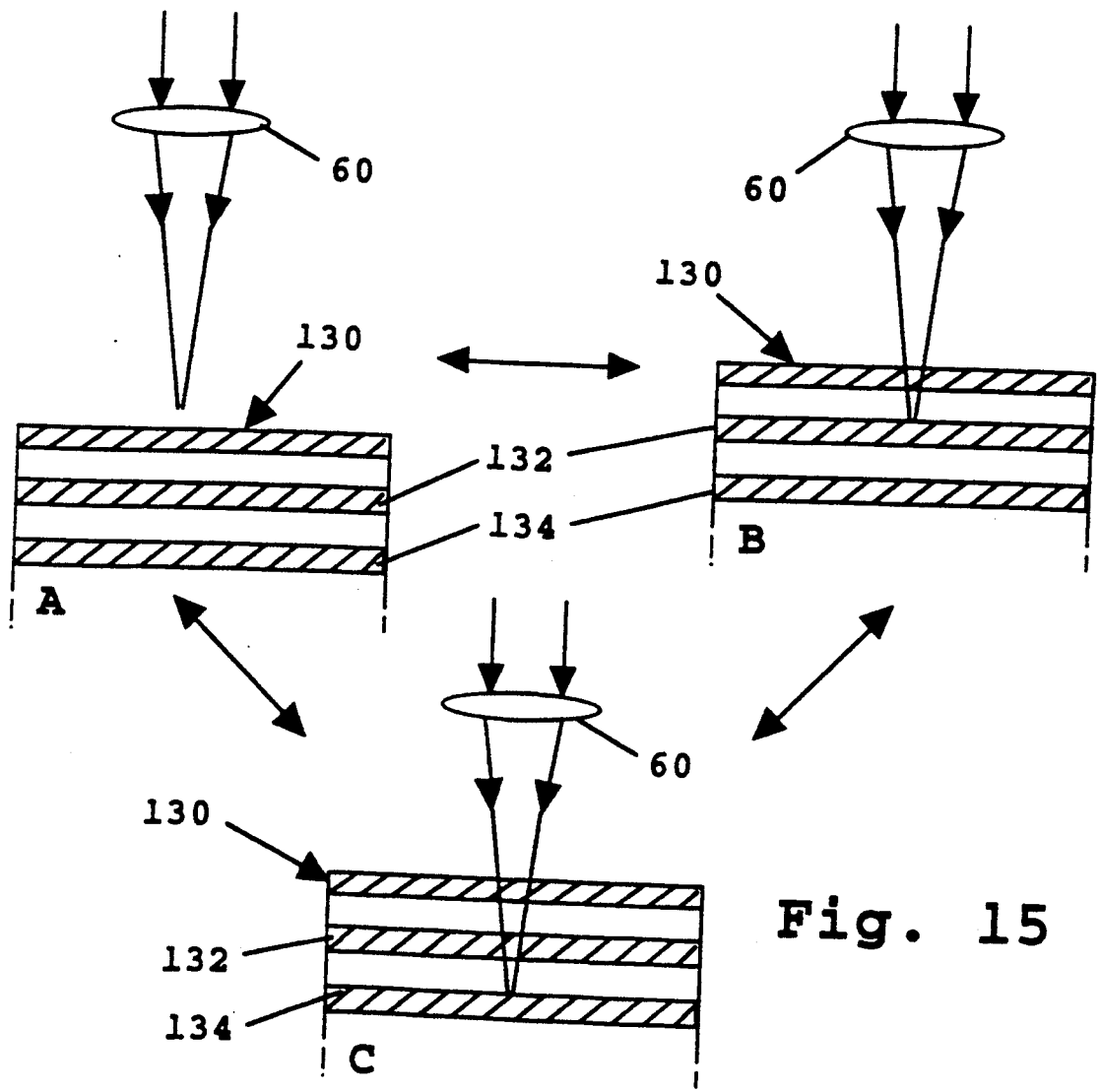
FIG. 15 shows the adjustable relationship between the focusing lens and the surface of each member of a set of stacked optical discs in accordance with an embodiment of the invention.

FIG. 15 illustrates how the disc device is read in a laser disc reading operation. In FIG. 15A, the objective lens is focused on the uppermost disc, and the disc device is then rotated and/or moved translationally, as above, to read selected disc data locations. To read the second or third disc, the lens is adjusted to bring its focal plane into the plane of the second or third disc, as illustrated at FIG. 15B and FIG. 15C, respectively.

As an example of the increased data-storage density which can be achieved in the stacked disc, the adjustable position objective lens will be assumed to be a 100X microscope objective lens having a NA value of 0.6. This lens has a focal plane depth of $10\mu$. Such an objective will distinguish layers of holes spaced $20\mu$ apart. A medium having an index of refraction of 0.1 would provide 0.1% retroreflected light intensity. If 2 mm of useful depth is available (this will depend on the actual material used), 1000 separate layers could be formed. Using the results of the calculation above for a single layer having hole depths varying from 0 to 100 nm, a total storage capacity of $6.4 \times 10^{13}$ bits/5 in diameter disc is possible. At 40 kb per page of text, such a device could store 1.6 billion pages in an optical memory whose volume is 30 cm$^3$.

Alternatively, a three-dimensional data storage disc could be constructed using memory technology currently under development in which photochromic molecules are embedded in a polymer matrix which can be interconverted between two states by laser light to represent a bit of data (Parthenopoulis). In this approach, a moving focal plane is used as above, to read and write specific layers of the matrix.

As indicated above, the above embodiments may include the use of optical fibers to connect the laser source with the data storage device. As long as the fiber optic link preserves phase relationships in the incident and reflected light, light from the laser may be sent through the optical fibers to the data medium and the reflected light can travel back along the same fibers to be analyzed. This may be used to allow data reading when the optical disc(s) are separated from the laser, for example, by allowing the laser light to travel over a fiber optic phone line, or over a fiber optic bus in a computer, to the disc's location.

IV. Vibration Transducer

Figure 16:
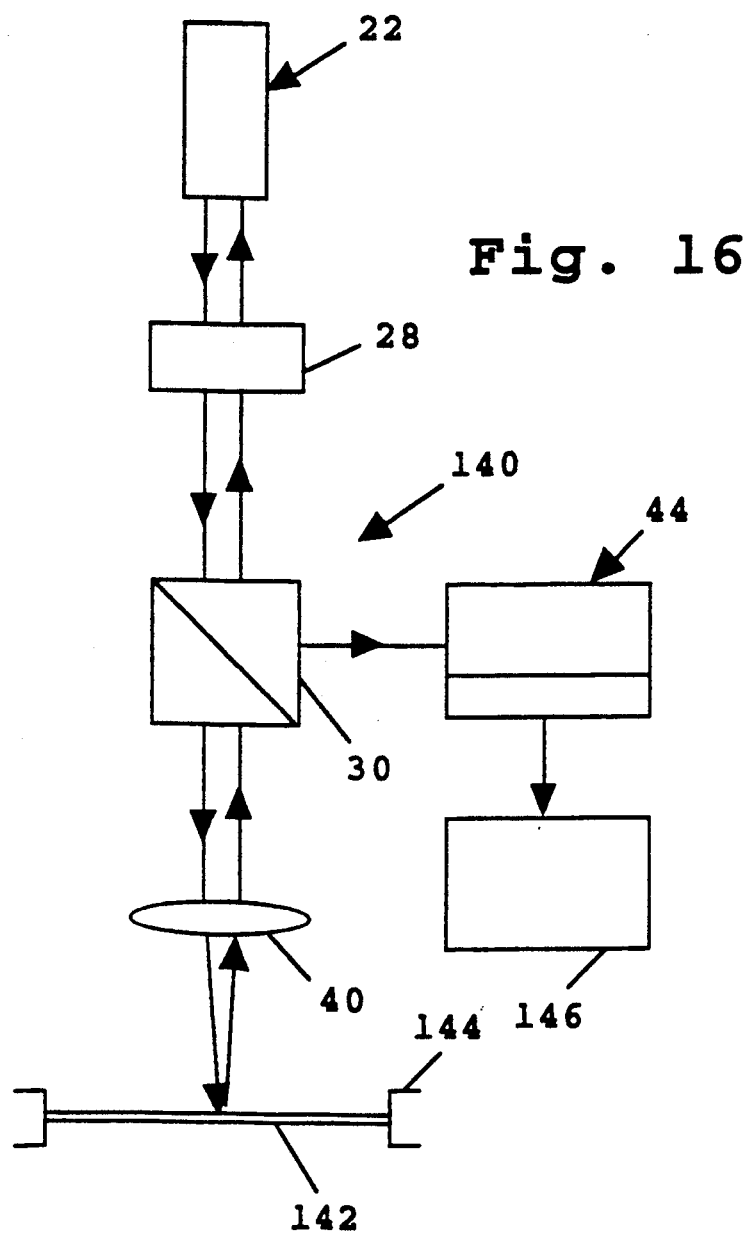
FIG. 16 is a schematic diagram of an apparatus to measure the surface vibrations of a target and process the resulting information in accordance with still another embodiment of the invention.

FIG. 16 shows an embodiment of the invention for use in measuring mechanical vibrations, such as sound vibrations or vibrations through a solid medium, such as for use in seismic detection or structural analysis.

The apparatus shown in the figure and indicated generally at 140 includes the basic optical elements described above, including a stabilized laser 22, a half-wave plate 28, a beam splitter 30, an objective lens 40, and a photodetector 44.

The target in apparatus 140 is a plate or membrane 142 which is response to mechanical vibrations which are to be measured or recorded. The membrane shown in the figure is a circular membrane anchored at its periphery to a stationary support 144, and is suitable, for example, for responding to sound vibrations. The membrane is designed to (a) vibrate with picometer/nanometer vibration displacements, and (b) preferably provide non-specular reflection. As shown here, the optical elements are arranged to project the incident light beam on the center of the membrane.

The apparatus further includes a signal-processing unit 146 which receives the voltage output signal from the photodetector, and performs one or a number of conventional signal processing/storing operations, including averaging, smoothing, filtering, analog-to-digital conversion, and signal storage.

In operation, when an incident beam from the laser strikes the vibrating surface, the time-dependent displacements (amplitude of vibration) are converted by the apparatus to power-level variations in which (a) the amplitude of the power level variations are linearly related to the amplitude of the vibration amplitude and (b) the frequency of the power level variations corresponds to the vibration frequency.

V. Applications to Fiber Optic Sensing Devices

The present invention relies on the use of phase changes in back reflected light to modulate laser power output, due to phase-related shifting of the position of the atomic gain curve of the laser. It is also proposed herein that this phenomenon can be exploited in applications in which phase shifts in coherent light carried in optical fibers are produced by external means.

Optical fiber sensing has become a major field of interest over the past decade. New techniques using optical fibers involve the sensing of phenomena which put mechanical stress on the optical fibers such as pressure, temperature, and magnetic or electric fields. The stresses induced on the fiber by these factors change the optical properties of the fiber, and these changes induce time-varying phase shifts in the light which can be directed back to the laser, and measured as power fluctuations in laser output.

Such phase changes are currently measured by interferometric methods, but these require complicated arrangements using reference beams to measure the displacement of the reflected light relative to the reference. The present method, on the other hand, can measure time-varying phase shifts directly.

Examples of such applications of optical fiber technology include measuring the response to changes in temperature or pressure of an object by monitoring the effects on a fiber optic wire wrapped around that object, and measuring the response of the fiber to changes in external environment, such as exposure to chemicals, sound, voltage, or temperature/pressure changes.

Although the invention has been described with respect to particular embodiments and applications, it will be apparent to one skilled in the art how the method and apparatus of the invention can be modified or adapted to a variety of other applications.

What is claimed is:

1. A method of measuring time-dependent surface displacements, in the picometer/nanometer range of displacement magnitudes, in a target surface which produces diffuse, non-specular reflection, comprising
   producing a coherent output beam from a stable-resonator laser having a resonator cavity,
   directing at least a portion of the output beam at the target surface on which time-dependent surface displacements are occurring,
   by said directing, producing a retroreflected coherent beam from said target surface which is coincident with the beam directed against the target,
   allowing the retroreflected beam to reenter the resonator cavity of the laser,
   measuring the power output of said output beam, and
   determining the amplitudes of such time-dependent displacements as a substantially linear function of time-dependent variations in the measured power output of the output beam.

2. The method of claim 1, wherein the laser output beam is linearly polarized, and said directing includes directing the light beam against a beam splitter which is constructed (i) to split the output beam from the laser into an incident beam which is directed against the surface of such target, and a secondary beam which is directed against the photodetector, to allow the power of the laser output beam to be measured, and (ii) to permit a retroreflected coherent beam produced by directing said incident beam against such target surface and which is coincident with said incident beam to reenter the resonator cavity of the laser.

3. The method of claim 2, wherein said incident beam is generated from a gas laser which operates in two longitudinal modes which are linearly polarized at right angles to one another.

4. The method of claim 1, wherein said directing includes focusing said beam through an objective lens onto the surface of the target.

5. The method of claim 1, which further includes adjusting the amount of retroreflected light directed from the target into the laser resonator cavity, to maintain the level of power variations measured within a range in which the magnitude of such variations are substantially linearly related to the magnitude of surface displacements.

6. The method of claim 5, wherein said adjusting includes varying the angle of incidence of the laser beam on the target surface.

7. The method of claim 1, for use in examining surface features of a target along the axis of the incident beam, which further includes (a) focusing said incident beam to a team point which lies substantially in the plane of the surface to be examined, (b) scanning the beam point over the surface of the target during said measuring, to measure the variations in power output as a function of scanning position on the target, where the time-dependent surface displacements are produced by said scanning, and (c) using the measured power levels to construct a map of showing surface displacement as a function of surface position.

8. The method of claim 7, wherein said scanning is performed with the incident beam disposed at an acute angle with respect to the plane of the target surface.

9. The method of claim 1, for use in data storage retrieval, wherein said target is a data storage disc, digital information is stored on the disc in the form of a surface displacement at each of a plurality of data storage positions on the disc, which further includes (a) focusing said incident beam to a beam point which lies substantially in the plane of the data storage disc, (b) moving the beam point relative to the disc surface to place the beam point successively at selected data storage positions, with such moving producing such time-dependent surface displacements, (c) recording the measured power output at each of the selected storage positions, to determine the displacement at the selected positions, and (d) from the power levels measured at the selected storage positions, determining the digital information contained at the selected positions.

10. The method of claim 9, wherein said positions are arranged on the data storage disc in the form of a spiral track or annular tracks, and said moving includes rotating the data storage disc, to permit reading at different angular positions.

11. The method of claim 9, wherein data is stored on a plurality of such data storage discs, the discs are optically transparent and are arranged in a stacked configuration, which further includes the step adjusting the focus of said incident beam to a beam point which lies substantially in the plane of a selected one of the storage disc, prior to said moving step.

12. The method of claim 9, wherein the displacement at each data position of the storage disc represents one of a plurality of multi-bit words.

13. The method of claim 9, wherein said incident light beam and retroreflected light beam are carried between the laser and the disc surface through an optical fiber whose distal end is placed adjacent the disc surface.

14. The method of claim 1, for measuring the frequency and amplitude of vibrations on the surface of the target, wherein the amplitude of the vibration is determined from the total time-dependent variations in the power level measured by the detector, and the frequency is determined from the frequency of the time-dependent variations in power level.

15. The method of claim 14, for use in recording or amplifying mechanical waves, wherein said target is caused to vibrate in response to such waves, and the measured power variations are amplified for storage or sound reproduction.

16. The method of claim 14, for use in mapping surface features of a target surface, wherein the incident beam is directed against the target surface by a waveguide.

17. The method of claim 1, for use in sensing variations at a remote target which can be accessed by an optical fiber, wherein said incident light beam and retroreflected light beam are carried between the laser and the target surface through an optical fiber whose distal end is placed adjacent the target surface.

18. Apparatus for retrieving data which is encoded in the form of position-dependent surface displacements, comprising
a stable-resonator laser having a resonator cavity, for use in producing a polarized, coherent output light beam,
means for measuring the power output of a polarized coherent light beam,
a target having a surface which produces diffuse, non-specular reflection and on which position-dependent surface displacement digital data is encoded, in the form of surface displacements in the range of displacements magnitudes between about $10_{-12}$ and $10_{-7}$ meters,
means for directing a portion of the output light beam against the surface of such target, and permitting retro-reflected coherent beam produced by directing said beam portion against such target surface and which is coincident with said beam portion to reenter the resonator cavity of the laser, and
means for positioning the beam portion, in a time-dependent fashion, at selected positions on the disc surface, wherein the beam sees time-dependent variations in surface displacements on the disc, and
a data-output unit for determining from the time-dependent variations in the laser output beam measured by the photodetector, the digital data value at each of the selected positions on the disc, by applying a linear relationship between such power variations and displacements on the disc.

19. The apparatus of claim 18, wherein said moving means includes means for rotating said disc at a selected speed, and means for moving the incident beam to selected positions along a radial axis of the rotating target.

20. The apparatus of claim 19, wherein data are stored on the disc surface in the form of multi-bit digital words having at least $N>2$ possible states represented by one of N displacement values, one of which may correspond to the surface of the disc.

21. The apparatus of claim 18, wherein the data are stored on the disc surface in the form of digital bits having two possible states represented by one of two displacement values, one of which may correspond to the surface of the disc.

22. The apparatus of claim 18, which further (a) includes at least one other disc, where the two or more discs are optically transparent and arranged in a stacked, parallel configuration, and (b) an objective lens which is adjustable to place the beam at a focal plane position corresponding to a selected storage disc.

23. The apparatus of claim 22, wherein data are stored on each disc surface in the form of digital bits having two possible states represented by one of two displacement values, one of which may correspond to the surface of the disc.

24. The apparatus of claim 22, wherein data are stored on each disc surface in the form of multi-bit digital words having at least $N>2$ possible states represented by one of N displacement values, one of which may correspond to the surface of the disc.

25. The apparatus of claim 18, which further includes an optical fiber for directing the incident beam against the data storage disc, and for carrying the retroreflected beam from the disc back to the laser cavity.

26. Apparatus for transducing external sound or mechanical vibrations to electrical signals, comprising
a plate whose surface produces diffuse, non-specular reflection, and which is responsive to such external vibrations to produce surface vibrations which have time-dependent surface displacements in the range of displacement magnitudes between about $10^{-12}$ and $10^{-7}$ meters,
a stable-resonator laser having a resonator cavity, for use in producing a polarized, coherent output light beam,
means for measuring the power output of a polarized coherent light beam,
means for directing a portion of the output light beam against the surface of such target, and permitting retroreflected beam produced by directing said beam portion against such target surface and which is coincident with said beam portion to reenter the resonator cavity of the laser, and a data-output unit for processing and/or storing a voltage signal produced by the measuring means.

27. The apparatus of claim 26, for use as a microphone, wherein said amplified power level variations are converted to an analog or digital form suitable for sound reproduction.

28. The apparatus of claim 26, for use in detecting vibrations in a solid medium, wherein said amplified power level variations are converted to a digital form suitable for signal processing.

* * * * *

UNITED STATES PATENT AND TRADEMARK OFFICE
CERTIFICATE OF CORRECTION

PATENT NO. : 5,029,023

DATED : July 2, 1991

INVENTOR(S) : Alan J. Bearden and Michael P. O'Neill

It is certified that error appears in the above-identified patent and that said Letters Patent is hereby corrected as shown below:

On the title page, Item [56]
References Cited, add the following:

3,409,370  11/1968  King et al.

"Science in British Industry," New Scientist $\underline{323}$:180 (1963).

"The Laser Feedback Interferometer," J. Sci. Instrum. $\underline{41}$:489-492 (1964).

"Compact scanning-force microscope using a laser diode," Optics Letters $\underline{13}$, 12:1057-1059 (12/1988).

At Col. 11, lines 54 and 55, delete "$2^n$" and insert --$2^N$--.

UNITED STATES PATENT AND TRADEMARK OFFICE
CERTIFICATE OF CORRECTION

PATENT NO.  :  5,029,023
DATED       :  July 2, 1991
INVENTOR(S) :  ALAN J. Bearden and Michael P. O'Neill It is certified that error appears in the above-identified patent and that said Letters Patent is hereby corrected as shown below:

AT COL. 14, line 55, delete "team" and insert --beam--.

Signed and Sealed this

Sixteenth Day of February, 1993

Attest:

STEPHEN G. KUNIN

Attesting Officer    Acting Commissioner of Patents and Trademarks